Figure 1:
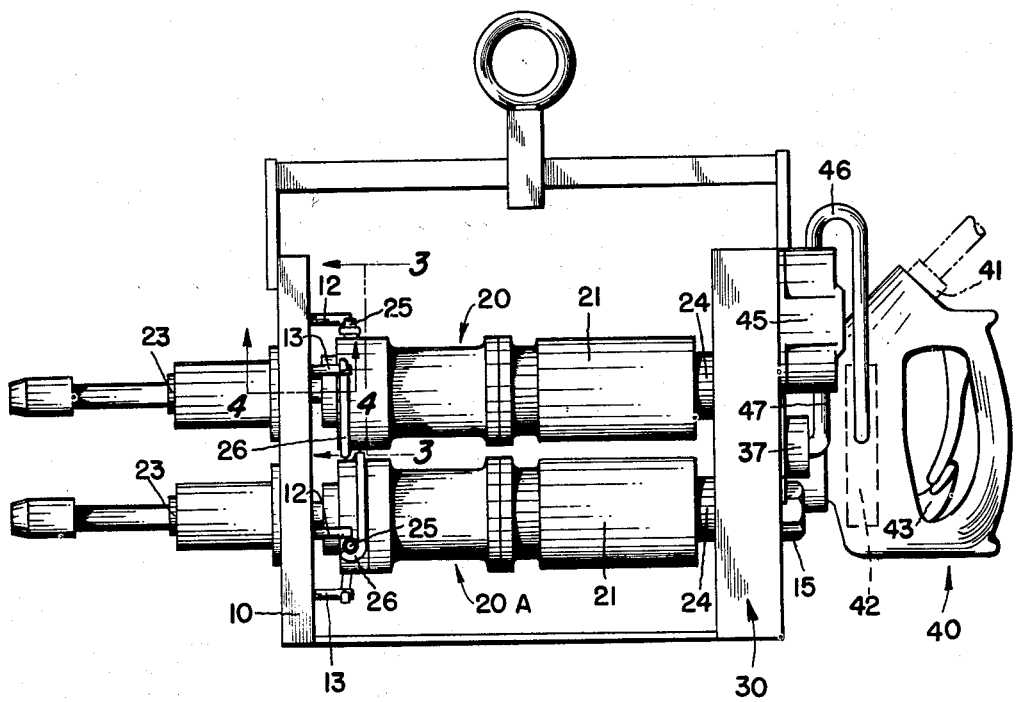

April 27, 1965     E. G. SPYRIDAKIS ETAL     3,180,612
TORQUE TOOLS

Filed Sept. 26, 1962     4 Sheets-Sheet 1

INVENTORS
EMANUEL G. SPYRIDAKIS
LELAND W. BECK
JOHN M. STEADLE
BY
Charles J. Worth
AGENT April 27, 1965  E. G. SPYRIDAKIS ETAL  3,180,612
TORQUE TOOLS Filed Sept. 26, 1962  4 Sheets-Sheet 2

INVENTORS
EMANUEL G. SPYRIDAKIS
LELAND W. BECK
JOHN M. STEADLE

BY Charles J. Worth
AGENT

April 27, 1965 E. G. SPYRIDAKIS ETAL 3,180,612
TORQUE TOOLS
Filed Sept. 26, 1962 4 Sheets-Sheet 3

INVENTORS
EMANUEL G. SPYRIDAKIS
LELAND W. BECK
JOHN M. STEADLE
BY Charles J. Worth
AGENT April 27, 1965     E. G. SPYRIDAKIS ETAL     3,180,612

TORQUE TOOLS

Filed Sept. 26, 1962     4 Sheets-Sheet 4

INVENTORS
EMANUEL G. SPYRIDAKIS
LELAND W. BECK
JOHN M. STEADLE

BY Charles J. Worth

AGENT

United States Patent Office 3,180,612
Patented Apr. 27, 1965

3,180,612
TORQUE TOOLS
Emanuel G. Spyridakis, Sayre, Pa., Leland W. Beck, Westfield, N.J., and John M. Steadle, Waverly, N.Y., assignors to Ingersoll-Rand Company, New York, N.Y., a corporation of New Jersey
Filed Sept. 26, 1962, Ser. No. 226,371
18 Claims. (Cl. 253—1)

This invention relates to rotary motor torque tools and particularly to controls therefor to automatically provide high and low torque output during each torquing cycle so that rotary driven fasteners may be rapidly driven to an accurately predetermined tightness.

At the present time, tools capable of dual range torquing are expensive and complicated. One type requires high and low pressure feed lines while another has means for shifting gears interconnecting a motor with a driving head of a torquing tool to vary torque output at predetermined intervals. Still further, manual operating means or timing devices have been utilized to provide such two stage tightening. However, all of the foregoing are of complicated construction, are expensive to manufacture, are subject to malfunction, and have other undesirable shortcomings.

Accordingly, it is an object of this invention to provide a power control for a motor of a tool for torquing fasteners at high speed to an accurately predetermined tightness.

Another object of this invention is to provide a torque responsive control connecting a single power source to a rotary motor of a torquing tool to derive sequenced low and high torque output during each torquing cycle.

Still another object of this invention is to provide a control connecting a single power source of a rotary motor torquing tool for initial low force/high speed output until the motor approaches stall at a predetermined torque output which effects the control to provide a short terminal period of high force/low speed operation.

And still another object of this invention is to provide signal means in association with the aforementioned controls.

This invention contemplates a rotary motor tool having driving means at one end thereof mounted in structure including a receiver connecting the power source to the tool motor. The tool is spring biased to a limited first position providing an initial power connection to derive a low force/high speed motor operation until the torque output reaches a predetermined level where the motor approaches stall, wherein the tool responds to such torque and rotates against the spring bias changing the power connection to derive high force/low speed motor operation.

The foregoing and other objects and advantages of the invention will appear more fully hereinafter from a consideration of the detailed description which follows, taken together with the accompanying drawings wherein several embodiments of the invention are illustrated by way of example. It is to be expressly understood, however, that the drawings are for illustration purposes only and are not to be construed as defining the limits of the invention.

Figure 2:
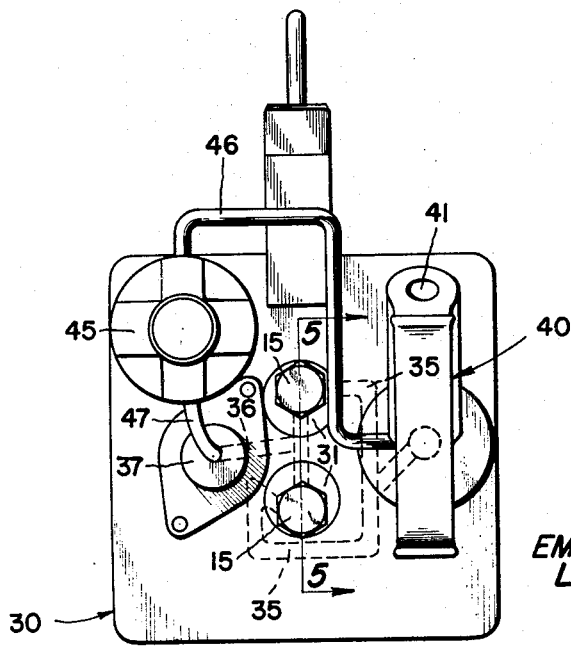
Figure 3:
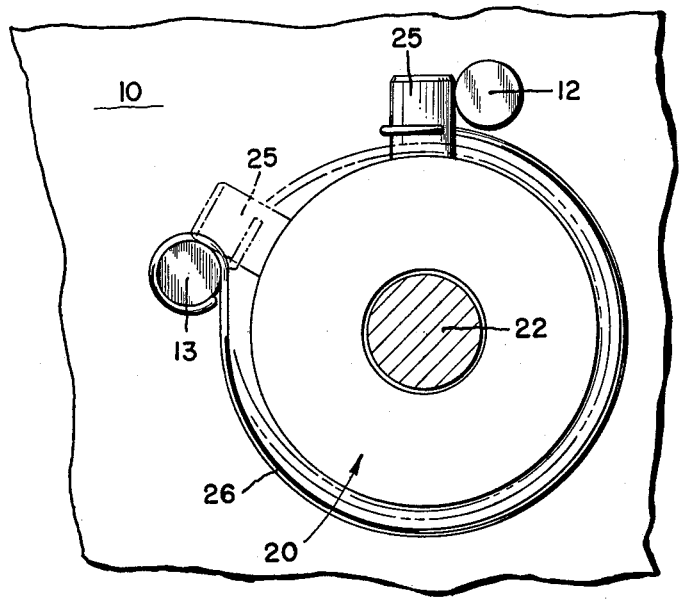
Figure 4:
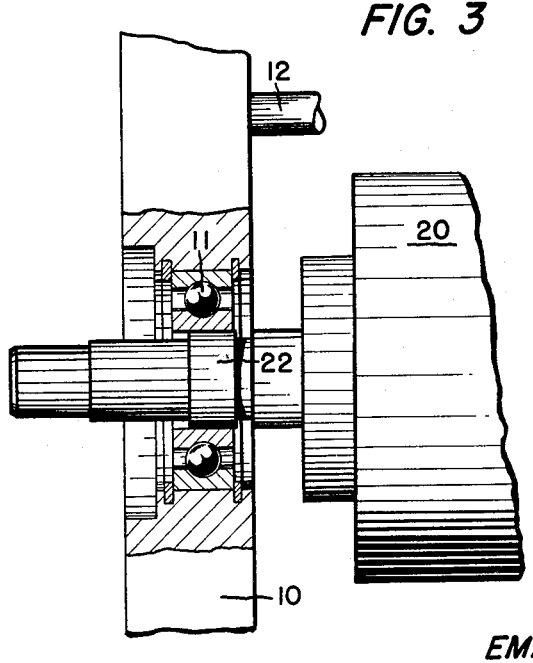
Figure 5:
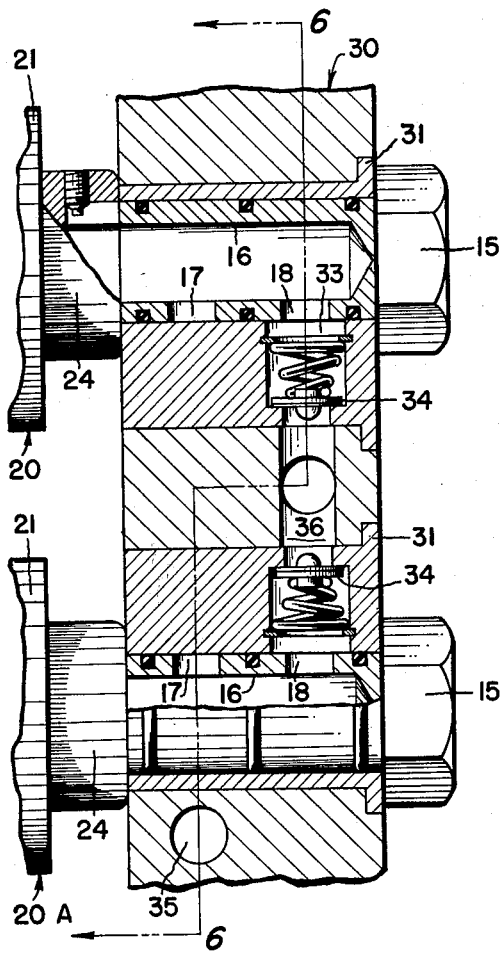
Figure 6:
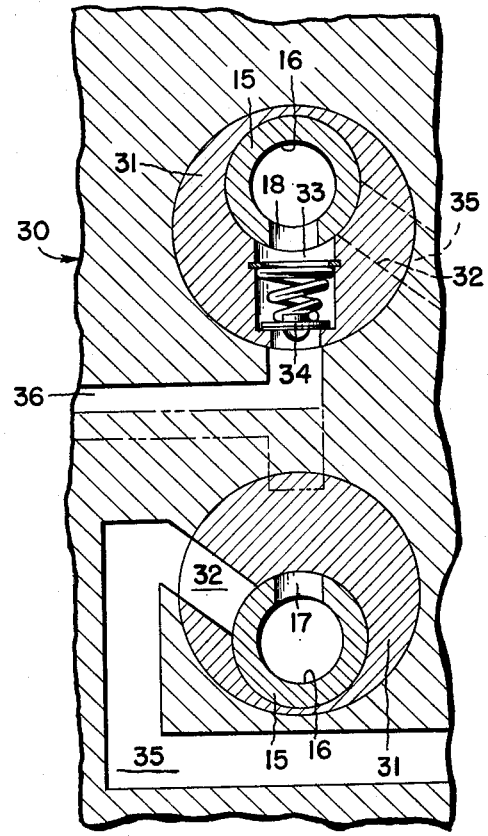

FIGURE 1 is an elevational view of a tool constructed in accordance with the invention, FIGURE 2 is a rear end view of the novel tool of FIGURE 1, FIGURES 3 and 4 are enlarged sectional views taken on lines 3—3 and 4—4, respectively, of FIGURE 1, FIGURE 5 is an enlarged sectional view taken on line 5—5 of FIGURE 2, FIGURE 6 is a sectional view taken on line 6—6 of FIGURE 5, and FIGURES 7 to 9 are diagrammatic views of modifications of the novel tool of FIGURES 1 to 6.

Referring now to the drawings, a pair of torquing tools 20 and 20A are rotatably mounted in structure comprising a mounting plate 10 spaced from a receiver or manifold 30. Inasmuch as both tools are of the same construction and have equivalent associated structure, only tool 20 will be described in detail.

Torquing tool 20 has a front spindle 22 mounted in a bearing 11 in the mounting plate 10, and a chuck portion 23 extending past such mounting plate. Plate 10 has a pair of angularly spaced pins 12 and 13 which are engaged by a pin 25 in the forward portion of the torquing tool 20 to limit rotation thereof between two operating positions. A spring 26 biases tool 20 relative to plate 10 and maintains the tool in its low power receiving or low force/high speed output position, as will be further described. When the torque output of tool 20 reaches a predetermined level, it will rotate against the bias of spring 26 until pin 25 engages pin 13 in plate 10 thus assuming its high power receiving or high force/low speed output position. Tool 20 has a motor 21 and a backhead 24 for receiving pressure fluid for driving such motor 21.

Connected to and spaced from mounting plate 10 is the manifold or receiver 30 having a bushing 31 with angularly spaced high pressure and low pressure ports 32 and 33, respectively, with a check valve 34 disposed in the low pressure port 33. A stud 15 extends through the bushing 31 and into the backhead 24 of tool 20 to provide the rear pivot for the torquing tool, and has a blind axial bore 16 with axially spaced high and low pressure ports 17 and 18, respectively. When the position of tool 20 is maintained by spring 26, low pressure port 18 of stud 15 is alined with the low pressure port 33 of the bushing 31. However, when the torque output of tool 20 reaches a predetermined level, the resulting force rotates tool 20 on spindle 22 and stud 15 against the force of spring 26 misalining low pressure ports 18 and 33, and alining high pressure ports 17 and 32. Check valve 34 in low pressure port 33 prevents feedback of high pressure from the blind bore 16 of stud 15.

A hand grip 40, mounted on the manifold 30, has an inlet 41 adapted to be connected to a source of high pressure fluid, and a throttling valve 42 operated by a trigger 43 for connecting inlet 41 to a high pressure passage 35 in manifold 30 which communicates with high pressure port 32 of bushing 31. A pressure regulator 45, mounted on manifold 30, has a high pressure inlet line 46 connected to throttling valve 42, and a low pressure outlet line 47 connected to a low pressure inlet 37 in the manifold 30 that is connected by a low pressure passage 36 to low pressure port 33 of bushing 31.

Thus, it now should be readily understood, by moving trigger 43 to operate valve 42, high pressure fluid at inlet 41 is provided through high pressure passage 35 to the high pressure port 32 of bushing 31, and through inlet line 46 to pressure regulator 45. The high pressure port 17 of stud 15 is misalined from high pressure port 32 of bushing 31 and, therefore, blocks flow of high pressure fluid to motor 21. However regulator 45 reduces the pressure of the fluid received through line 46, and provides low pressure fluid through its outlet line 47, the low pressure manifold inlet 37, and the low pressure manifold passage 36 to the low pressure port 33. With low pressure ports 18 and 33 alined, low pressure fluid flows through the blind bore 16 of stud 15 and the backhead 24 to drive motor 21 of torquing tool 20 for run-down or the low torque output portion of the torquing cycle.

When the torque output of tool 20 reaches a predetermined level, motor 21 tends to stall and tool 20 rotates against the force of spring 26 until pin 25 engages pin 13 on mounting plate 10. Now, low pressure port 18 of stud 15 is misalined from low pressure port 33 of bushing 31 to block low pressure fluid from pressure regulator 45. Simultaneously, however, high pressure port 17 of stud 15 is now alined with high pressure port 32 of bushing 31 to connect high pressure fluid provided from throttling valve 42 by high pressure manifold passage 35. Thus high pressure fluid passes through the alined high pressure ports 17 and 32, which are connected by the axial bore 16 and the backhead 24, to provide high pressure fluid to drive motor 21 for final torquing or the high torque output portion of the torquing cycle.

Tool 20A is of the same construction as tool 20, and cooperates with corresponding parts of the manifold. Accordingly, tool 20A is not described in detail. However, the fact that the novel device is shown and described as having two torquing tools 20 and 20A should not be construed as defining limits of the invention. It is intended to be indicative that a device made in accordance with the invention is not limited to the number of torque tools which it may have, except by its weight, power available, and application.

By controlling the pressure of the fluid provided to each tool 20 or 20A, final torque output can be accurately set. This is especially true because such tool 20 or 20A is not effected by inertia of the motor 21 because such inertia is alleviated when the motor approaches a stall prior to final torquing.

Figure 7:
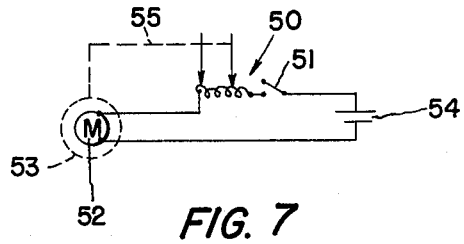

The principles of the novel device can be applied to a modification as diagrammatically shown in FIGURE 7. The modified arrangement is electrically driven wherein a step transformer 50 or similar power level control device corresponds to the pressure regulator 45 and the valving means, and a manual make/break switch 51 corresponds to throttle valve 42. Accordingly, an electric motor 52 of a modified tool 53 is connected by a circuit including the transformer 50 to a source 54 of electricity. The switch 51 normally maintains the circuit open when tool 53 is not in use. Mechanical or servo means 55 connects tool 53 to transformer 50.

Closing switch 51 provides relatively low power from source 54, across transformer 50 to drive motor 52 during run-down. When motor 52 approaches stall, tool 53 rotates to reset transformer 50 and provide relatively high power for final torquing.

Figure 8:
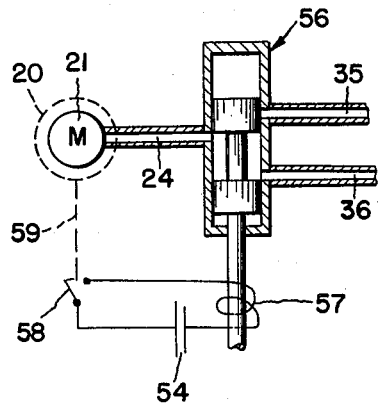

A combination of the arrangements of FIGURES 1 to 6 and FIGURE 7 is diagrammatically shown in FIGURE 8 wherein a solenoid valve 56 replaces the valving means of the all fluid arrangement and normally connects the low pressure line 36 through the back head 24 to drive motor 21 during run-down. When motor 21 approaches stall, tool 20 rotates against spring 26. Valve 56 has a solenoid coil 57 connected to the power source 54 by a circuit including a normally open switch 58 operatively connected by means 59 to the tool 20. Therefore, when tool 20 rotates, switch 58 closes energizing coil 57 which, in turn, shifts valve 56 to block low pressure line 36 and connect high pressure line 35 to the back head 24.

Figure 9:
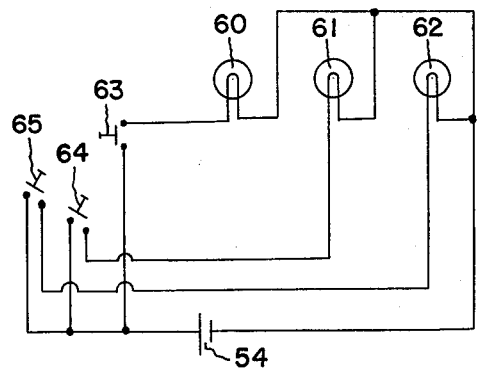

A device made in accordance with the invention as hereinbefore described is adapted to visual signal or alarm means as is diagrammatically shown in FIGURE 9.

There are three phases of operation for which such visual indication may be desirable, namely, run-down or low torque output operation, final torquing or high torque output operation, and completion of final torquing when the device has completed its torquing cycle and is to be shut down. It should be understood, however, one or more of such signals may be used.

Referring specifically to FIGURE 9, there are three lamps 60, 61, and 62, which when lit indicate the respective operating conditions as listed above. The lamps are connected to the power source 54 by a circuit with three normally open switches 63, 64, and 65. Therefore, as an example, when spring 26 biases tool 20 to the run-down position, switch 63 is closed and lamp 60 is lit. As tool 20 approaches stall and rotates against the bias of spring 26, switch 63 opens and switch 64 is closed. Thus, lamp 60 is turned off and lamp 61 is lighted. By providing an override (not shown), which is well known in the art, when tool 20 has reached its maximum torque output, switch 65 will close and lamp 62 will light.

Although the invention has been shown and described in a hand tool there is no intent to limit it thereto. It should be understood that the invention is equally adapted to use with machines of the drill press and nut runner varieties.

Accordingly, a novel device made in accordance with the invention as described herein, comprises a motor driven torque tool rotatably connected to a power receiver and between two terminal positions, spring means for biasing said tool to one of such positions when the torque output of the tool is below a predetermined level, said receiver having power reducing means and adjustable power connecting means for connecting the tool motor to the reducing means to receive lower power when the tool is in its biased position, and said tool rotating to its other position against the spring bias when its torque output reaches such predetermined level to adjust the power connecting means to provide higher motive power to the tool motor for final torquing.

Although several embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

We claim:

1. A torquing device comprising:
  (a) a manifold adapted to receive motive power having low and high power transmission means,
  (b) a torque tool pivotally connected to said manifold for rotation relative thereto between a first and second operating position,
  (c) said torque tool having a motor for torque output that is connected to the low power transmission means when said tool is in the first operating position and is connected to the high power transmission means when the tool is in the second operating position,
  (d) and a mounting plate means including means for biasing the tool to the first operating position when the torque output is below a predetermined level,
  (e) said torque tool rotating against said biasing means to the second operating position when the torque output exceeds the predetermined level.

2. A torquing device comprising:
  (a) a manifold adapted to receive motive power having low and high power transmission means,
  (b) a torque tool pivotally connected to said manifold for rotation relative thereto between a first and second operating position,
  (c) said torque tool having a motor for torque output that is connected to the low power transmission means when said tool is in the first operating position and is connected to the high power transmission means when the tool is in the second operating position, (d) a mounting plate means including means for biasing the tool to the first operating position when the torque output is below a predetermined level, (e) said torque tool rotating against said biasing means to the second operating position when the torque output exceeds the predetermined level, (f) and signal means that is energized when said tool is in one of the operating positions.

3. A torquing device comprising:
(a) a manifold adapted to receive motive power having low and high power transmission means,
(b) a torque tool pivotally connected to said manifold for rotation relative thereto between a first and second operating position,
(c) said torque tool having a motor for torque output that is connected to the low power transmission means when said tool is in the first operating position and is connected to the high power transmission means when the tool is in the second operating position,
(d) mounting plate means including means for biasing the tool to the first operating position when the torque output is below a predetermined level,
(e) said torque tool rotating against said biasing means to the second operating position when the torque output exceeds the predetermined level,
(f) a pair of signal means to indicate low and high torque output,
(g) and means for energizing one of said pair of signal means when said tool is in each of the operating positions.

4. A torquing device comprising:
(a) a manifold adapted to receive motive power having low and high power transmission means,
(b) a torque tool pivotally connected to said manifold for rotation relative thereto between a first and second operating position,
(c) said torque tool having a motor for torque output that is connected to the low power transmission means when said tool is in the first operating position and is connected to the high power transmission means when the tool is in the second operating position,
(d) a mounting plate means including means for biasing the tool to the first operating position when the torque output is below a predetermined level,
(e) said torque tool rotating against said biasing means to the second operating position when the torque output exceeds the predetermined level,
(f) a pair of signal means to indicate low and high torque output and a third signal means to indicate final torque,
(g) and means for energizing one of said pair of signal means when said tool is in each of the operating positions,
(h) said energizing means having an override for energizing the third signal means when said tool provides final torque.

5. A torquing device comprising:
(a) a manifold having an inlet adapted to receive pressure fluid and transmission means for such fluid in communication with the inlet,
(b) a tool pivotally connected to said manifold for rotation relative thereto between a first and second operating position, said tool having a fluid motor to provide a torque output in response to pressure fluid from said manifold,
(c) said motor having an inlet in communication with said transmission means to receive pressure fluid,
(d) control means for such pressure fluid operably associated with said transmission means and actuated by said tool when rotated to provide such fluid having a reduced motive force when said tool is in the first operating position,
(e) and a mounting plate means including means biasing said tool to the first operating position when the torque output is below a predetermined level,
(f) said motor rotating said tool relative to said manifold to the second operating position when the torque output exceeds such predetermined level.

6. A torquing device comprising:
(a) a manifold having an inlet adapted to receive pressure fluid and a valve chamber, said manifold having a pair of passages each connecting the inlet to the chamber for transmitting pressure fluid,
(b) pressure regulator means connected to said manifold and forming part of one of said pair of passages to reduce the pressure of fluid flowing therethrough,
(c) a tool pivotally connected to said manifold for rotation relative thereto between a first and second operating position, said tool having a fluid motor to provide a torque output in response to pressure fluid from said manifold,
(d) valve means movable in the chamber for connecting said motor to the passage with said pressure regulator means when said tool is in the first operating position and to the other of said passages when said tool is in the second operating position,
(e) and a mounting plate means including means biasing said tool to the first operating position when the torque output is below a predetermined level,
(f) said motor rotating said tool relative to said manifold to the second operating position when the torque output exceeds such predetermined level.

7. A torquing device comprising:
(a) a manifold having an inlet adapted to receive pressure fluid and a valve chamber, said manifold having a pair of passages each connecting the inlet to the chamber for transmitting pressure fluid,
(b) pressure regulator means connected to said manifold and forming part of one of said pair of passages to reduce the pressure of fluid flowing therethrough,
(c) a tool pivotally connected to said manifold for rotation relative thereto between a first and second operating position, said tool having a fluid motor to provide a torque output in response to pressure fluid from said manifold,
(d) a valve member connected to said tool and rotatable in the valve chamber therewith for connecting said motor to the passage with said pressure regulator means when said tool is in the first operating position and to the other of said passages when said tool is in the second operating position,
(e) and a mounting plate means including means biasing said tool to the first operating position when the torque output is below a predetermined level,
(f) said motor rotating said tool relative to said manifold to the second operating position when the torque output exceeds such predetermined level.

8. The torquing device in accordance with claim 6,
(a) and having a signal circuit to indicate the operating position of said tool,
(b) indicator means in said circuit for each operating position,
(c) and control means in said circuit actuated by said tool to connect each of said indicator means to a source of energizing power.

9. The torquing device in accordance with claim 7,
(a) and means in said circuit for indicating final torque output,
(b) and said control means having an override to connect said final torque indicating means to a source of energizing power.

10. A torquing device comprising:
(a) a manifold having an inlet adapted to receive pressure fluid and a valve chamber, said manifold having a pair of passages each connecting the inlet to the chamber for transmitting pressure fluid, (b) pressure regulator means connected to said manifold and forming part of one of said pair of passages to reduce the pressure of fluid flowing therethrough, (c) a tool pivotally connected to said manifold for rotation relative thereto between a first and second operating position, said tool having a fluid motor to provide a torque output in response to pressure fluid from said manifold, (d) valve means movable in the chamber for connecting said motor to the passage with said pressure regulator means when said tool is in the first operating position and to the other of said passages when said tool is in the second operating position, (e) solenoid means connected to said valve means and actuated by rotation of said tool to move such valve means, (f) and a mounting plate means including means biasing said tool to the first operating position when the torque output is below a predetermined level, (g) said motor rotating said tool relative to said manifold to the second operating position when the torque output exceeds such predetermined level.

11. A torquing device comprising:

(a) a receiver adapted to receive electricity and having transmission lines for such electricity, (b) a tool pivotally connected to said receiver for rotation relative thereto between a first operating position and a second operating position, said tool having an electric motor connected to said transmission lines to provide torque output in response to electricity from said receiver, (c) means in one of said transmission lines operatively connected to said tool to control electrical transmission to said motor in accordance with the operating position of said tool, (d) and a mounting plate means including means for biasing said tool to the first operating position when the torque output is below a predetermined level, (e) said motor rotating said tool against the biasing means to the second operating position when the torque output exceeds such predetermined level.

12. The torquing device in accordance with claim 11, (a) and having a signal circuit connected to said transmission lines to indicate the operating position of said tool, (b) indicator means in said circuit for each operating position, (c) and switch means in said circuit actuated by said tool to control energizing said indicator means in accordance with the operating position of said tool.

13. The torquing device in accordance with claim 12, (a) and means in said circuit for indicating final torque output, (b) and said switch means having an override to energize said final torque indicating means.

14. A torquing device comprising:

(a) a manifold adapted to receive motive power having low and high power transmission means, (b) a torque tool pivotally connected to said manifold for rotation relative thereto between a first and second operating position, (c) said torque tool having a motor for torque output connected to the power transmission means to provide low torque output when said tool is in the first operating position and high torque output when said tool is in the second operating position, (d) and a mounting plate means including means for biasing the tool to the first operating position when resistance to the torque output is below a predetermined level, (e) said output torque rotating said tool against said biasing means to the second operating position as the motor approaches stall when resistance to the torque output exceeds such predetermined level.

15. A torquing device comprising:

(a) a manifold having an inlet adapted to receive pressure fluid and transmission means for such fluid in communication with the inlet, (b) a tool pivotally connected to said manifold for rotation relative thereto between a first and second operating position, said tool having a fluid motor to provide a torque output in response to pressure fluid from said manifold, (c) said motor having an inlet in communication with said transmission means to receive pressure fluid, (d) control means for such pressure fluid operably associated with said transmission means and actuated by said tool when rotated to provide such fluid having a reduced motive force when said tool is in the first operating position, (e) and a mounting plate means including means biasing said tool to the first operating position when resistance to the torque output is below a predetermined level, (f) said motor rotating said tool relative to said manifold to the second operating position when resistance to the torque output exceeds such predetermined level and the force of said biasing means.

16. A torquing device comprising:

(a) a receiver adapted to receive electricity and having transmission lines for such electricity, (b) a tool pivotally connected to said receiver for rotation relative thereto between a first operating position and a second operating position, said tool having an electric motor connected to said transmission lines to provide torque output in response to electricity from said receiver, (c) means in one of said transmission lines operatively connected to said tool to control electrical transmission to said motor in accordance with the operating position of said tool, (d) and a mounting plate means including means for biasing said tool to the first operating position when resistance to the torque output is below a predetermined level that exceeds the force of such biasing means, (e) said motor rotating said tool against the biasing means to the second operating position when resistance to the torque output exceeds such predetermined level.

17. A torquing device comprising:

(a) a manifold adapted to receive motive power having low and high power transmission means, (b) a plurality of torque tools each pivotally connected to said manifold for rotation relative thereto between a first and second operating position, (c) each of said torque tools having a motor for torque output that is connected to the low power transmission means when said tool is in the first operating position and is connected to the high power transmission means when the tool is in the second operating position, (d) and a mounting plate means including a plurality of means each biasing one of said tools to the first operating position when the torque output is below a predetermined level that exceeds the force of such biasing means, (e) each of said torque tools rotating against its biasing means to the second operating position when the torque output exceeds the predetermined level.

18. A torquing device comprising:

(a) a manifold adapted to receive motive power having low and high power transmission means, (b) a plurality of torque tools each pivotally connected to said manifold for rotation relative thereto between a first and second operating position, (c) each of said torque tools having a motor for torque output connected to the power transmission means to provide low torque output when said tool is in the first operating position and high torque output when said tool is in the second operating position, (d) and a mounting plate means including a plurality of means each for biasing one of said tools to the first operating position when resistance to its torque output is below a predetermined level, (e) each output torque rotating the associated tool against its biasing means to the second operating position as its motor approaches stall when resistance to the torque output exceeds such predetermined level.

No references cited.

KARL J. ALBRECHT, *Primary Examiner.*

ORIS L. RADER, JOSEPH H. BRANSON, Jr.,
*Examiners.*